3,197,640
METHOD OF TREATING GRASS SEED

Clarence J. Speas, Clinton, Tenn., assignor to Oak Ridge Atom Industries, Inc., a corporation of Tennessee
No Drawing. Filed Oct. 9, 1961, Ser. No. 143,545
4 Claims. (Cl. 250—106)

This invention relates to the treatment of grass seed and more particularly to the irradiation of grass seed in order to produce in the resulting plants, improved root systems and more rapid growth.

The extensive research conducted in conjunction with this invention has shown that each variety of grass seed has its own irradiation requirements for maximum stimulation, varying with the moisture content of the seed, which can be approximately compensated in terms of a function of prevailing relative humidity, denoted $f(H)$.

The types of grasses to which most of this research has been directed, in decreasing order of their sensitivity to irradiation, are orchard grass, fescues, rye grasses, blue grasses and redtop.

The degree of stimulation of the plants produced from seed treated in accordance with the present invention has been established on the bases of root development and rate of growth. The most accurate criterion of root development has been found to be the surface area of the roots, which can be determined rather closely in terms of their weight. Inasmuch as the dosage requirements of grass seed vary with moisture content or relative humidity conditions, it becomes necessary for maximum stimulation to expose the seed under constant moisture conditions, or, alternatively, modify the dosage to compensate for differences in moisture conditions with respect to a selected standard.

Approximate values of total dosages in roentgens required for maximum stimulation of the varieties of grasses specified, at a prevailing relative humidity of 65%, have been established as follows:

Orchard grass _____ 500
Fescues _____ 1000
Rye grasses _____ 1200
Blue grasses _____ 1400
Redtop _____ 1500

The total dosages in roentgens required for maximum stimulation of these varieties over a wide range of values of prevailing relative humidities are as follows:

| Relative humidity | 30% | 50% | 65% | 75% | 85% |
|---|---|---|---|---|---|
| Orchard Grass | 250 | 350 | 500 | 850 | 1,200 |
| Fescues | 450 | 900 | 1,000 | 1,200 | 1,400 |
| Rye Grasses | 600 | 1,000 | 1,200 | 1,400 | 1,800 |
| Blue Grasses | 650 | 1,100 | 1,400 | 1,650 | 2,000 |
| Red top | 1,000 | 1,200 | 1,500 | 1,800 | 2,000 |

The rate of irradiation of the seed is also important, preferably ranging from 10 roentgens per minute to 500 roentgens per minute, a range of 100 to 500 roentgens per minute producing the maximum degree of stimulation and appreciably expediting the treatment. At these rates of exposure, it is preferable that the thickness of the material undergoing treatment be of the order of 3 inches or less. Where large quantities of the seed are being treated, in order to achieve uniformity of exposure, it is preferable to shift the position of the material with respect to the source of irradiation at least once during the exposing period.

The grasses referred to can be identified more specifically as follows:

Orchard grass (*Dactylis glomerata* L.)
Fescues:
    Tall fescues (*F. arundenacea*)—
        Kentucky-31
        Alta
    Red fescues (*Festucarubra*)—
        Creeping red
        Chewings
Rye grasses (Tolium species):
    Italian
    Perennial or English
Blue grasses:
    Kentucky (*Poa pratensis*)
    Canada (*Poa compressa*)
    Rough (*Poa trivialis*)
Redtop (*Agrastis alba*)

The sources of gamma rays employed and preferred are cobalt-60 and cesium-137 and the treatment is effected with conventional equipment.

The "sensitivity" of grass seed of a particular variety signifies the dosage required to produce a given stimulation, a growth reduction, or actual destruction of the embryo. Hence, the higher the sensitivity, the smaller will be the required dosage. Of the varieties enumerated, orchard grass has the highest sensitivity and redtop the lowest.

As result of the method expressed in the appended claims, the resulting root growth within a specified time has been appreciably enhanced and yields of the grasses themselves have been substantially larger.

I claim:

1. A method of treating grass seed of the group consisting of orchard grass, fescues, rye grasses, blue grasses and redtop comprising irradiating said seed with gamma rays at a rate between 10 and 500 roentgens per minute with a total dosage of between 250 and 2000 roentgens.

2. A method of treating grass seed according to claim 1 wherein the rate of irradiation is between 100 and 500 roentgens per minute.

3. A method of treating grass seed according to claim 1 wherein the irradiation is effected with cobalt-60.

4. A method of treating grass seed according to claim 1 wherein the irradiation is effected with cesium-137.

References Cited by the Examiner

UNITED STATES PATENTS 1,218,850    3/17    Fry _____ 250—106 X
2,456,909    12/48    Brasch _____ 250—51 X

OTHER REFERENCES

International Conference on Peaceful Uses of Atomic Energy, United Nations Press, 1955, volume 12, pages 34 to 45 including articles by Mikaelsen and Caldecott.

International Conference of Peaceful Uses of Atomic Energy, United Nations Press, 1958, volume 27, pages 233 to 248, an article by Saric.

RALPH G. NILSON, *Primary Examiner.*